(12) United States Patent
Dick et al.

(10) Patent No.: US 6,943,555 B2
(45) Date of Patent: Sep. 13, 2005

(54) REDUNDANT SAFETY CIRCUIT FOR SQUIB TESTING

(75) Inventors: Geoffrey E. Dick, Winter Park, FL (US); Darrell L. Perkins, Goldenrod, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 96 days.

(21) Appl. No.: 10/152,816

(22) Filed: May 23, 2002

(65) Prior Publication Data

US 2003/0218462 A1 Nov. 27, 2003

(51) Int. Cl.[7] .......................... G01R 31/00; H02H 3/08
(52) U.S. Cl. ..................................... 324/502; 361/93.1
(58) Field of Search ................................ 324/502, 549, 324/550, 711; 701/29, 45, 31; 340/438; 361/88, 93.1, 56

(56) References Cited

U.S. PATENT DOCUMENTS

| | | | | |
|---|---|---|---|---|
| 3,774,151 A | * | 11/1973 | Lewis et al. | 280/735 |
| 3,863,208 A | * | 1/1975 | Balban | 280/735 |
| 4,893,109 A | * | 1/1990 | Vrabel et al. | 340/438 |
| 5,081,442 A | | 1/1992 | Ito et al. | |
| 5,166,880 A | | 11/1992 | Furui | |
| 5,229,909 A | * | 7/1993 | Tessmer et al. | 361/104 |
| 5,268,643 A | | 12/1993 | Aso et al. | |
| 5,293,153 A | | 3/1994 | Rochette et al. | 340/438 |
| 5,294,153 A | | 3/1994 | Nolan | |
| 5,459,449 A | * | 10/1995 | Ravas et al. | 340/438 |
| 5,461,358 A | | 10/1995 | Ravas, Jr. et al. | |
| 5,541,523 A | * | 7/1996 | Tourville et al. | 324/711 |
| 5,596,497 A | * | 1/1997 | Honda | 701/45 |
| 5,656,991 A | * | 8/1997 | Hargenrader et al. | 340/438 |
| 5,668,528 A | | 9/1997 | Kitao et al. | |
| 5,677,838 A | | 10/1997 | Itou et al. | |
| 5,805,058 A | | 9/1998 | Saito et al. | |
| 5,825,282 A | | 10/1998 | Aronne | |
| 5,850,085 A | | 12/1998 | Rosenbluth | |
| 6,300,764 B1 | * | 10/2001 | Kelley | 324/502 |
| 6,700,766 B2 | * | 3/2004 | Sato | 361/93.1 |
| 2002/0084780 A1 | * | 7/2002 | Bolda et al. | 324/202 |

OTHER PUBLICATIONS

Keithley Model 2010 Multimeter Quick Reference Guide, Rev. A, Keithley Instruments, Inc., 1996, pp. 1–52.
Keithley Model 2010 Multimeter Service Manual, Rev. C, Keithley Instruments, Inc. 1996.
Keithley Model 2010 Multimeter User's Manual, Rev. D, Keithley Instruments, Inc., 1996.

* cited by examiner

*Primary Examiner*—Anjan Deb
(74) *Attorney, Agent, or Firm*—Buchanan Ingersoll pc

(57) ABSTRACT

An apparatus for measuring the resistance of a squib, including an input for receiving a power supply and a circuit connected to the input for limiting the power supplied to the squib. The circuit includes a voltage limiter which limits voltage output of the circuit to a level insufficient to ignite the squib, and a current limiter for limiting the current output of the circuit, the current limiter being responsive to a current supplied upon activation of the voltage limiter to limit the total energy supplied by the circuit to a predetermined level following activation of the voltage limiter. The voltage limiter can be a parallel arrangement of diodes connecting first and second conductive leads. The current limiter can include fuses which open when diodes conduct current through the conductive leads. This apparatus prevents squib activation even if an overcurrent or overvoltage occurs in the ac power supply.

27 Claims, 8 Drawing Sheets

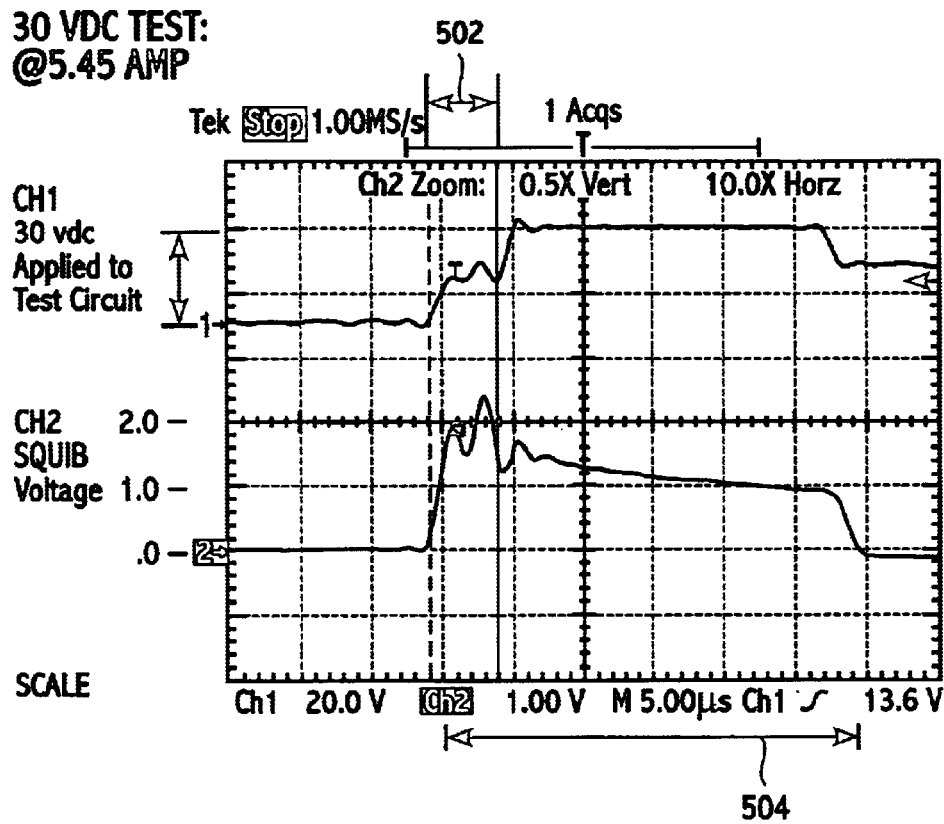

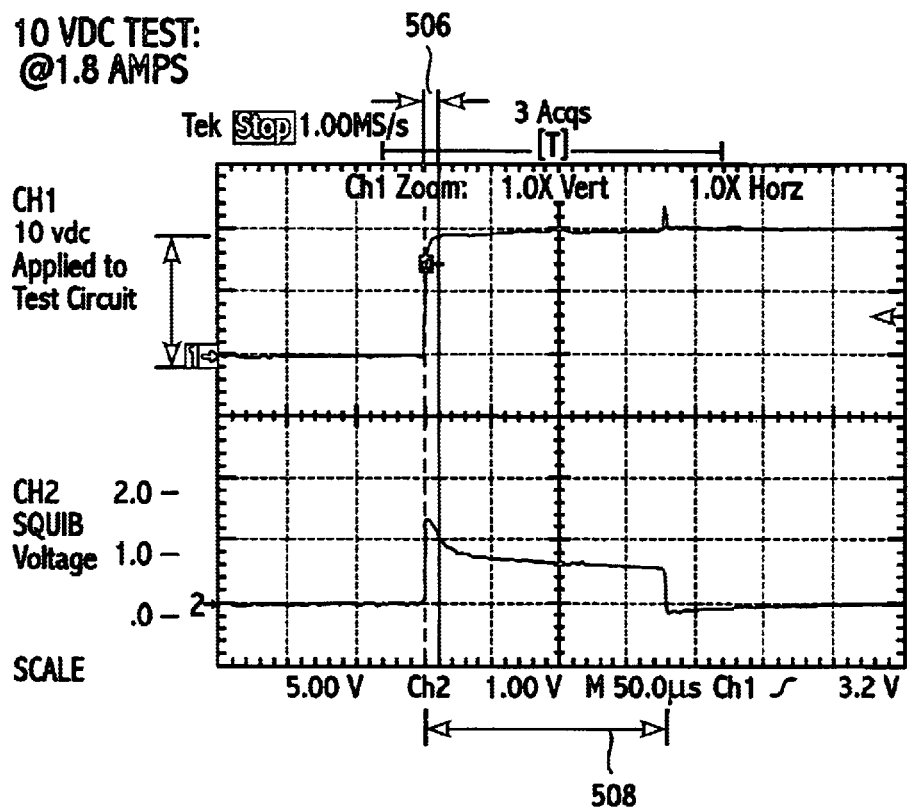

REDUNDANT SAFETY CIRCUIT FOR SQUIB TESTING

BACKGROUND OF THE INVENTION

1. Field of the Invention

The present invention relates to a testing device for a squib resistance element and a method of testing a squib. More particularly, the invention relates to a circuit for testing the resistance of a resistance-type squib.

2. Background Information

A squib is a resistance element, such as a low-resistance wire coated with or embedded in an explosive material. Squibs are activated by applying a current to the resistance element. When a current flows through the resistance element, the resistance element is heated, and the resulting high temperature can ignite the explosive material. A high current applied to the squib will heat the resistance element rapidly, causing very fast activation, and a lower current can also activate the squib when applied to the squib for a longer period of time.

Squibs are used as ignitors in various systems, including for example, missiles and vehicle airbag systems. To ensure the squibs will ignite when an activating current is applied, the squib resistance is measured to verify that the squib resistance falls within a desired range. If the squib resistance is too low, the activating current may not generate enough heat to ignite the explosive material in the desired time. If the squib resistance is too high, the squib will be more likely to ignite if even a low current is applied, rendering the squib too sensitive to stray electrical fields.

Squib test and monitoring devices have been used for testing inflatable air bag systems and other squib-activated systems. U.S. Pat. No. 5,461,358, Ravas Jr. et al., and U.S. Pat. No. 5,825,282, Aronne, for example, disclose squib resistance testing devices which determine the value of the squib resistance. U.S. Pat. No. 5,166,880, Furui, U.S. Pat. No. 5,081,442, Ito et al., and U.S. Pat. No. 4,893,109, Vrabel et al., each disclose a fault detection device which employs a comparator circuit to periodically provide a good/bad indication for each squib in an airbag activating system. U.S. Pat. No. 5,268,643, Aso et al. describes a fault detection system which determines whether a short circuit has occurred in the squib.

U.S. Pat. No. 5,668,528, Kitao et al., and U.S. Pat. No. 5,805,058, Saito et al., disclose squib actuating circuits for use in vehicle passenger protection systems. The test system disclosed in U.S. Pat. No. 5,850,085, Rosenbluth, activates the squib in a vehicle airbag system and measures the deployment of the airbag.

Other airbag squib resistance test devices use a charge time comparator circuit to determine whether squibs have sufficient resistance. Examples of these devices are found in U.S. Pat. No. 5,293,153, Rochette et al., U.S. Pat. No. 5,541,523, Tourville, and U.S. Pat. No. 5,656,991, Hargenrader et al., the disclosures of which are incorporated herein in their entirety.

A fault detector for a squib activating circuit for an air bag system is disclosed in U.S. Pat. No. 5,677,838, Itou et al. The system prevents accidental activation of a squib if a computer fault occurs.

One method for non-destructively testing squibs in missile systems has been to apply a small current across the squib using a battery powered ignition tester. It is desirable that the current applied across the squib does not actually ignite the squib during testing. This is particularly important in missile system testing. Traditionally, it has been considered risky to use ignition testers whose current is drawn from the AC power source available at the facility. Concerns included faults in the ignition tester or in the facility power source which could allow excess current to be applied to the squib, or even that a lightning strike or other surge in the power lines could cause excess current to be applied to the squib. These events had the potential to cause the explosive material of the squib to ignite. To avoid these risks, battery powered squib testers have traditionally been used to test squibs in missile systems.

A battery powered ignition tester manufactured by Valhalla Scientific Inc. has been used for determining squib resistance in missile systems. Because the maximum current which this tester can provide is less than the current necessary to activate most squibs, this device was considered unlikely to activate the squib. The batteries in this ignition tester support only limited hours of operations before the batteries must be recharged. In full scale production facilities, the need to recharge the batteries can cause production delays and increased costs.

Other ignition testers are available which use a Wheatstone bridge to limit the current. One such device is the manually operated ignition tester manufactured by Alinco, which limits the current to 150 milliamperes and a low voltage.

The disclosures of each of the above identified patents are incorporated herein by reference in their entireties.

SUMMARY OF THE INVENTION

In an exemplary embodiment of the invention, an apparatus for measuring the resistance of a squib includes an input for receiving a power supply and a circuit connected to the input for limiting the power supply. The circuit includes voltage limiting means for limiting a voltage output of the circuit to a level insufficient to ignite the squib, and current limiting means for limiting a current output of the circuit, the current limiting means being responsive to a current supplied upon activation of the voltage limiting means to limit the energy supplied by the circuit to a predetermined level following activation of the voltage limiting means.

In an exemplary embodiment, the input includes first and second conductive leads, and the voltage limiting means comprises a parallel arrangement of diodes between the first and second conductive leads.

In another exemplary embodiment, the current limiting means comprises a first fuse electrically coupled to the first conductive lead, a second fuse electrically coupled to the second conductive lead, the first and second fuses being sized so that at least one of the first and second fuses opens when a current in a conductive lead reaches a preset value in a time period less than a time required to ignite the squib. The predetermined time period can be less than the time required for the resistance element to heat sufficiently to ignite an adjacent explosive material. In another exemplary embodiment, the first and second fuses are rated to open upon application of a $\frac{1}{16}$th ampere current. In another exemplary embodiment, each of the first and second fuses open in less than ten milliseconds upon application of a 0.3 ampere current. In another exemplary embodiment, the first and second diodes are switching diodes and open in less than 35 nanoseconds upon application of a 5 ampere current.

An exemplary embodiment of the invention includes an apparatus for measuring the resistance of a squib in combination with a power supply means for supplying a voltage and a current. The apparatus includes an input for receiving a power supply and a circuit connected to the input for limiting the power supply. The circuit includes voltage limiting means for limiting a voltage output of the circuit to a level insufficient to ignite the squib, and current limiting means for limiting a current output of the circuit, the current limiting means being responsive to a current supplied upon activation of the voltage limiting means to limit the energy supplied by the circuit to a predetermined level following activation of the voltage limiting means. The power supply means can be a voltmeter. The power supply means can include a first and second electrical terminals for applying a current to the circuit, and third and fourth electrical terminals for receiving a voltage to be measured from the circuit. In another embodiment, the power supply means has a maximum output voltage of 20 millivolts when applying a test current of 1 milliampere for measuring a resistance element having a resistance of about 1 ohm.

Another exemplary embodiment of the invention includes an apparatus for measuring the resistance of a squib in combination with a squib having a resistance element. The apparatus can include an output for providing a voltage and a current to the squib, with the output electrically coupled to the squib. The output can be the first and second conductive leads of the circuit.

In another exemplary embodiment, the circuit includes circuit sensing means for determining the resistance of circuit elements between a squib and a power supply means. The circuit sensing means can include third and fourth conductive leads each having a terminal for electrical connection to the resistance element and another terminal for connection to an power supply means. The circuit can also include a fuse electrically coupled to the third conductive lead, and a fuse electrically coupled to the fourth conductive lead.

An exemplary method for measuring the resistance of a squib includes: providing a power supply means for supplying a current and a voltage; providing a circuit for connection to the power supply means, applying a current and voltage to the squib via the circuit and the power supply means, and measuring a resulting voltage. The provided circuit has an input for receiving a power supply, voltage limiting means for limiting a voltage output of the circuit to a level insufficient to ignite the squib, and current limiting means for limiting a current output of the circuit, the current limiting means being responsive to a current supplied upon activation of the voltage limiting means to limit the total energy supplied by the circuit to a predetermined level following activation of the voltage limiting means.

In another exemplary embodiment, the method can also include sensing the resistance of circuit elements in the circuit, and subtracting the circuit element resistance from a measured resistance of the circuit and the squib.

BRIEF DESCRIPTION OF THE DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein:

FIGS. 5a and 5b illustrate the results of applying test voltages to the apparatus of FIG. 4.

DETAILED DESCRIPTION OF THE PREFERRED EMBODIMENTS

Figure 1:
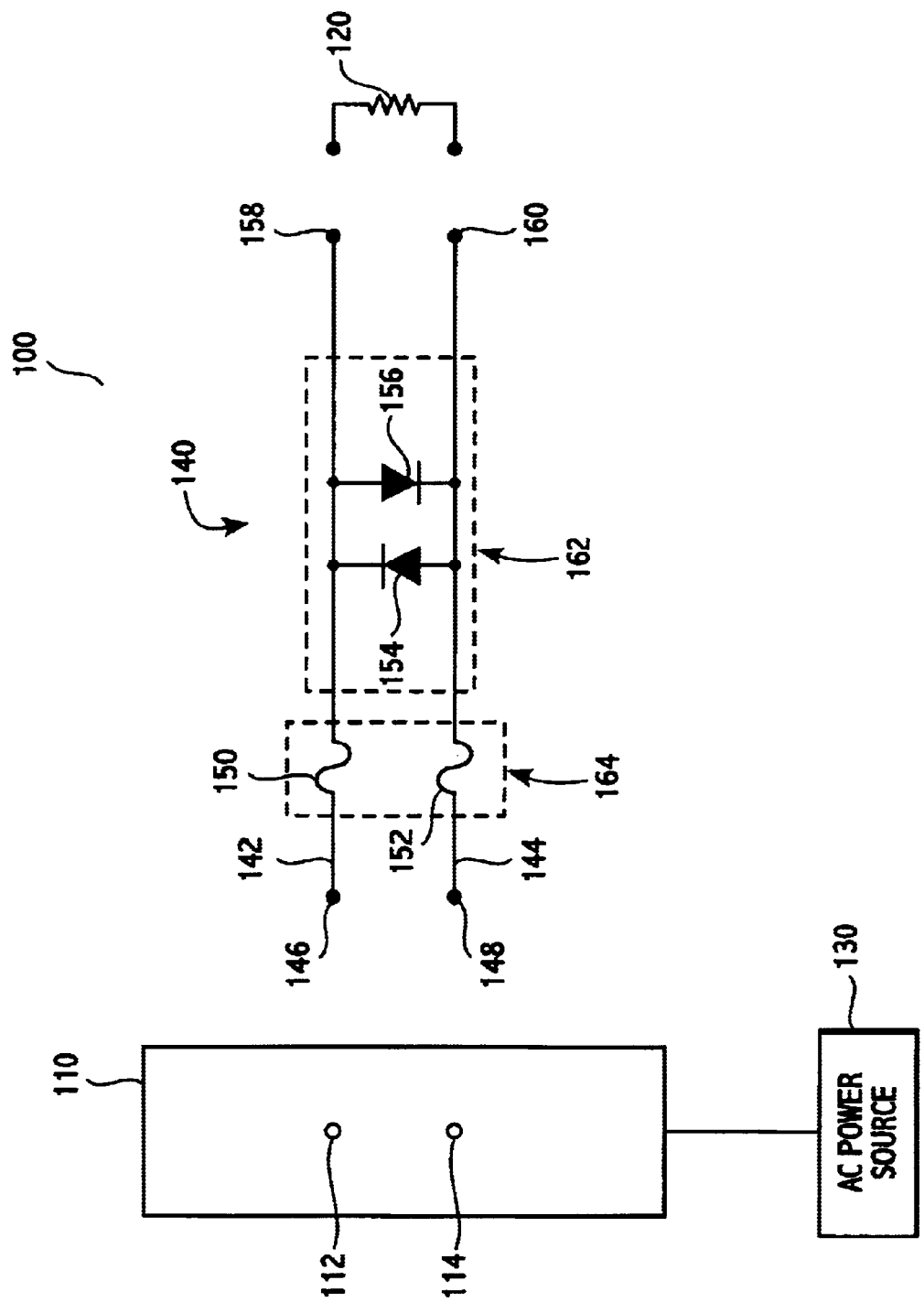
FIG. 1 illustrates an apparatus for measuring the resistance of a squib according to an exemplary embodiment of the invention.

FIG. 1 illustrates one embodiment of the invention, which is directed to an exemplary apparatus 100 for measuring the resistance of a resistance element using an electrical power source 130. Exemplary embodiments described herein acccomodate the application of electrical energy to the detonation device of a live munition without concern that the munition will detonate during the test.

According to an exemplary embodiment of the invention, the apparatus 100 includes an input for receiving a power supply and a circuit 140 connected to the input for limiting the power supply. The input can be any structure capable of receiving electrical power, including, for example, electrical leads or input terminals of a circuit. The input for receiving a power supply can be conductive elements for carrying a test current from terminals of the power supply means 110 to terminals of the resistive element 120. The circuit 140 includes voltage limiting means for limiting a voltage output of the circuit to a level insufficient to ignite a squib, and current limiting means for limiting a current output of the circuit. The current limiting means is responsive to a current supplied upon activation of the voltage limiting means to limit the energy supplied by the circuit to a predetermined level following activatation of the voltage limiting means.

Operation of the voltage limiter and a current limiter cooperate to preclude the exposure of the resistance element to a fault condition for more than a prescribed period of time.

The apparatus 100 described herein can be used to safely test the resistance of the resistive element within a squib, although it may be used to measure the resistance of other electrical devices. Squibs are designed to activate only when exposed to a given amount of energy. For example, a squib can be configured to activate only when a given voltage is applied for a period of time and when a current which is greater than their activation current flows through the squib (e.g. a 1 Ampere current at 1 Volt for 5 minutes). Of course, other parameters may be specified and the exemplary embodiments described herein are not limited to the exemplary parameters mentioned herein.

Embodiments of the invention are also directed to a method for measuring the resistance of a squib with a circuit having an input for receiving a power supply, voltage limiting means for limiting a voltage output of the circuit, and current limiting means for limiting a current output of the circuit. In an exemplary method, the method comprises applying a current and voltage to the squib by supplying power to the circuit, limiting an energy supplied by the circuit to the squib to a predetermined level by activating the voltage limiting means if the voltage across conductive leads of the circuit is greater than a predetermined level and activating the current limiting means responsive to a current supplied on activation of the current limiting means, and measuring a resulting voltage. Embodiments of the apparatus 100 as described herein can be used for this method, however, the method is not limited to the embodiments of the apparatus described herein.

The apparatus 100 can also include power supply means, such as a power supply 110, for providing current to the circuit. The power supply means 110 can be any device which is suitable to provide a current source to the circuit 140. Examples of suitable devices include voltmeters, ohmmeters, multi-meters, power conditioners, and signal processing devices, and can include analog and/or digital components. The power supply means 110 can be part of or include a computer based or automated test system.

The power supply means 110 has at least two terminals 112 and 114, through which a test current can be supplied to the circuit 140.

In an exemplary embodiment of the invention, the power supply means 110 can receive alternating electrical power, such as 120 V facility power. This allows the apparatus 100 to be used during production testing without any delays for replacing or recharging batteries. Of course, the power supply means 110 can be of a type which can use batteries or other power storage devices as a source of electrical power, and/or can include batteries as a backup power source.

In another exemplary embodiment, the electrical power supply means 110 can be a voltage measurement device which determines the resistance of the resistance element based on the current applied to the resistance element and the measured voltage across the resistive element.

In an exemplary embodiment of the invention, the power supply means 110 can include an internal voltage limiter which, in normal operation, limits the output voltage of the power supply means to a low level which is unlikely to ignite the explosive material of the squib.

An example of a suitable device is the low-noise multimeter available under the trade name 2010 Low Noise Multimeter, available from Keithley Instruments, Inc. of Cleveland, Ohio. This device operates on 110 Volt AC facility electrical power, with high speed, and at a relatively low test voltage and test current. For measuring a resistance less than 10 ohms, a 1 milliamp current can be applied, and the resulting resistance measurement has an accuracy of approximately 10 microamperes. A current of less than 0.2 milliamps can be used to perform a 1 millivolt dry circuit, 1 Ohm measurement. A "dry circuit" test mode is provided, in which a built-in clamp (voltage limiter) limits the open circuit test voltage to 20 millivolts. In the dry circuit test mode, the current the device can provide is approximately 10 milliamperes. An isolation transformer within the device isolates the device electronics from the power line voltage (e.g. up to a power line voltage of 8000 volts). A fuse (e.g. 0.25 ampere fuse) within the device opens in the event that a failure within the device allows too much current from the AC power source to pass through the device. The device also has relatively low internal noise, with a noise floor of less than 100 nanovolts. Additional information is found in the Keithley Model 2010 Multimeter Quick Reference Guide Rev. A, Model 2010 Multimeter Service Manual Rev. C, and Model 2010 User's Manual Rev. D, each of which are herein incorporated in their entirety.

Another suitable device for use is the Keithley Instruments 2700 Multimeter, which has the advantage of testing with less than 1 milliamp. The device has an internal switching unit with internal scanner control and relays, to enable the simultaneous testing of several resistance elements, and offset compensation to provide accurate resistance measurement. The Keithley Instruments 2750 Multimeter is also suitable.

In another exemplary embodiment, the apparatus 100 can include both a power supply means 110 and a separate voltage measurement device for determining the resistance of the squib resistance element 120.

The apparatus 100 includes a circuit 140 which carries a current to the resistance element. The circuit 140 includes an input for receiving a power supply. The input can be conductive elements for carrying a test current from terminals of the power supply means 110 to terminals of the resistive element 120. In an exemplary embodiment, the conductive elements include first and second electrically conductive lead 142, 144, each having a terminal 146, 148 which can be electrically connected to a terminal 112, 114 of the power supply means 110. The other terminals 150, 152 of the conductive leads 142, 144 can be electrically connected to the resistance element 120.

It is noted that as used herein, the terms "electrically coupled", "connected" and "electrically connected" include any type of suitable connection between electrical components, including both direct contact between the components, and indirect connections which can include, for example, the components being connected through an another electrical element, or when the components are inductively coupled.

In accordance with exemplary embodiments, the resistance element 120 can be protected from any high voltage or high current levels which might occur as a result of a failure of the power supply means 110 or an electrical surge in the power source 130. For example, the circuit 140 can include a current limiting means 164 and/or a voltage limiting means 162 to protect the resistance element 120 from overcurrents or overvoltages.

The current limiting means 164 can include any circuit elements which will cause an open circuit condition in the conductive leads 142, 144 if the current carried in the conductive leads 142, 144 exceeds a particular value. Suitable devices for use as current limiting means include fuses or other types of circuit interrupters. FIG. 1 illustrates the use of fuses 150, 152 serially connected in a first and a second conductive lead 142, 144.

In an exemplary embodiment, the fuses 150, 152 can be sized so that at least one of the fuses opens when a current in a conductive lead 142, 144 reaches a preset level in a time period less that the time required to ignite the squib. The current level above which the fuses open should be greater than the normal test current supplied by the power supply means 110, but below the current which would be required to heat the resistance element enough to cause ignite an adjacent explosive material (i.e., the squib's explosive material). The fuses 150, 152 can be very fast-acting fuses which will open very rapidly when subjected to an overcurrent, so that they open in a time period shorter than the time required for the resistance element to generate enough heat to cause the squib's explosive material to ignite. The fuses 150, 152 can be used to ensure that if a fault occurs which allows a large current to flow in the conductive leads 142, 144, the current through the resistance element 120 will not be large enough to activate the squib. In an exemplary embodiment, the fuses 150, 152 can be rated to open upon application of a $1/16$ ampere current. In another exemplary embodiment, the fuses 150, 152 are fast-acting fuses, which open very quickly in the event of an overcurrent. Exemplary fast acting fuses can be rated to open in less than 10 milliseconds if the current in a conductive lead is 0.3 amperes. Exemplary fast-acting fuses which are suitable are commercially available from Littlefuse. Inc., DesPlaines, Ill., under the catalog number Microfuse 279.062. Of course, different types and sizes of fuses having any desired performance characteristics can be used, as will be clear to those skilled in the art. It is noted that the term fast-acting fuse includes any fuses which are at least as fast as the fast-acting fuses set forth in the Littlefuse Fuse Selection Guide or at least as fast as the Type-F fuses of the International Electrotechnical Commission Publication 60127.

The current limiting means 164 acts in response to a current supplied upon activation of a voltage limiting means to limit the energy supplied by the circuit to a predetermined level following activation of the voltage limiting means 162.

The voltage limiting means 162 of the circuit 140 can be any type of device which will limit the voltage applied across the resistance element 120. The voltage limiting means 162 can be a parallel arrangement of diodes between the first and second conductive leads. For example, in the exemplary embodiment shown in FIG. 1, the voltage limiting means 162 comprises a pair of diodes 154, 156 connected to the conductive leads 142, 144. The diodes are arranged in a back-to-back parallel, or "antiparallel" arrangement, so that the anode of one diode 154 and the cathode of the other diode 156 are each connected to one conductive lead 144, and the cathode of one diode 154 and the anode of the other diode 156 are connected to the other conductive lead 142.

When the voltage across the conductive leads 142, 144 is less than the threshold voltage (i.e. dipole voltage drop) of the diodes 154, 156, operation is normal, and the diodes 154, 156 do not influence the circuit. Diodes 154, 156 can be selected which have a threshold voltage which is slightly larger than the voltage used to measure the resistance of the squib. As such, current can be supplied to the resistance element 120 during testing, and the diodes 154, 156 remain nonconductive.

However, if the supply voltage applied across the conductive leads 142, 144 increases to a level that is greater than the diode threshold voltage (e.g., as a result of a fault condition), the diodes 154, 156 will conduct and a current which is greater than the current used to measure the resistance of the resistance element will be conducted through one of the diodes from one conductive lead to the other conductive lead. The diode which conducts the current depends on the polarity of the overvoltage. The resulting current in the conductive lead will cause the fuse in that conductive lead (to which the diode cathode is connected) to open, preventing the increased current from being applied to the resistance element. Thus, the diodes act as an initial shunt to an increased current which results from a fault, and the fuse opens in response to the shunted current to inhibit prolonged exposure of the circuit to the fault condition.

In an exemplary embodiment, the diodes 150, 152 are 1N5618 ultrafast bipolar switching diodes screened to the JAN-TX level.

The FIG. 1 circuit 140, with back-to-back diodes 154, 156 and in-line fuses 150, 152, opens the circuit very rapidly if exposed to an undesired voltage and/or current. Because the resistance element requires some period of time to produce enough heat to ignite the explosive material of the squib, the relatively fast response of the circuit 140 prevents the squib from activating.

As will be clear to those of skill in the art, various types of diodes can be used, depending on the performance characteristics desired.

Other voltage limiting devices can also be used as voltage limiting means 162. These voltage limiting devices can include any semiconducting device which, either alone or in combination with the fuses 142, 144, allows a low voltage to be applied across the resistance element, but rapidly prevents an undesired higher voltage from being applied across the resistance element for a period of time sufficient to ignite the explosive material.

The circuit 140 can provide redundant protection of the squib resistance element 120 because when attached to a power supply means 110 which provides current and voltage limiting protection, the circuit 140 provides another layer of protection against overcurrent and overvoltage conditions.

In the exemplary embodiment in which the power supply means 110 includes a voltage measuring capability, the voltage across the conductive leads 142, 144 which results from passing through the resistance element 120 can be measured, and the resistance of the resistance element 120 can be determined.

In an exemplary embodiment, the conductive leads 142, 144 of the circuit 140 and any other wiring will be electrostatically shielded, to protect against the generation of stray currents.

Figure 2:
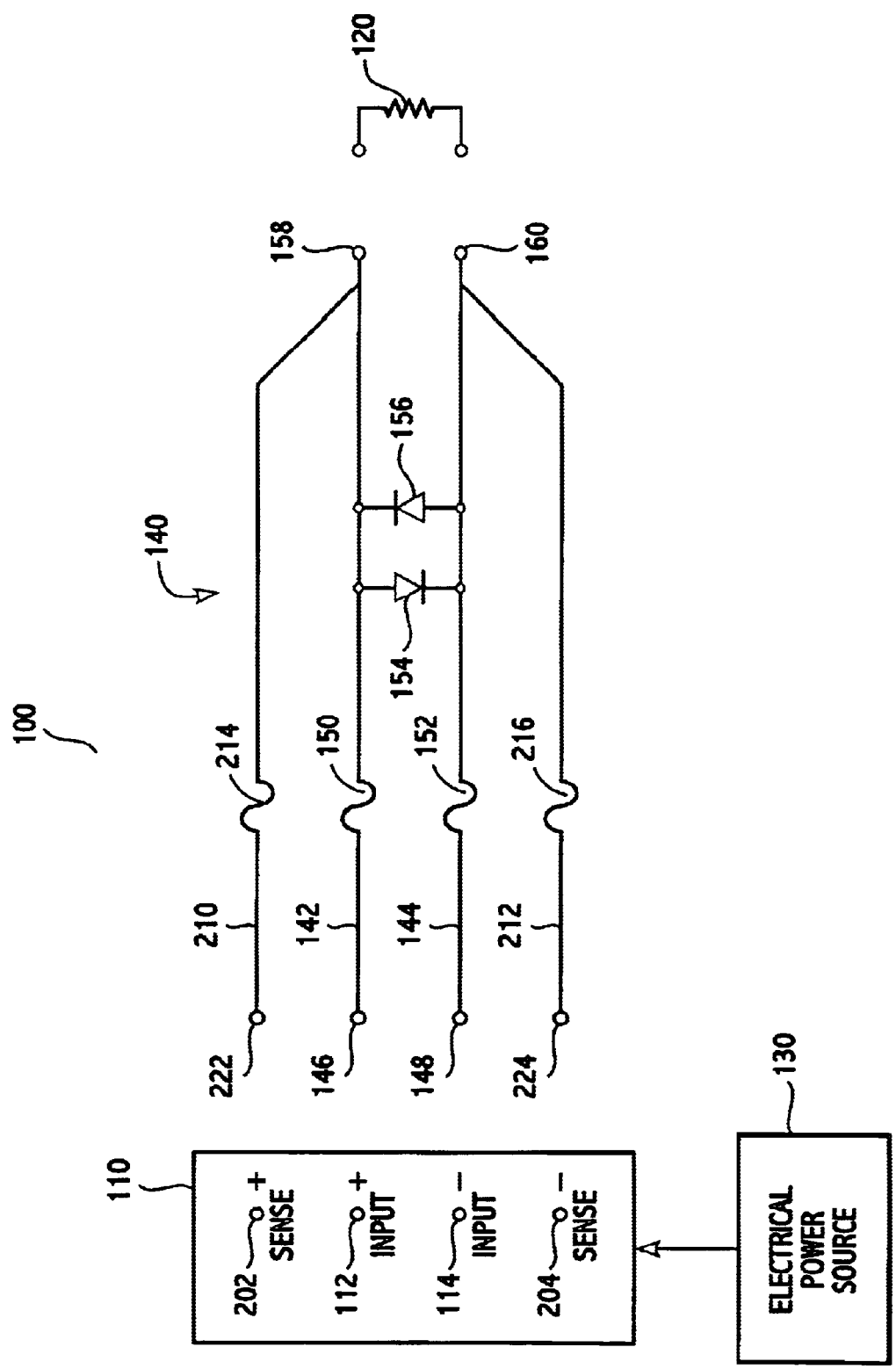
FIG. 2 illustrates an apparatus for measuring the resistance of a squib according to another exemplary embodiment of the invention.

FIG. 2 illustrates another exemplary embodiment of an apparatus 100 for measuring the resistance of a resistance element using an electrical power source 130. The power supply means 110 has a third terminal 202 and a fourth terminal 204 for electrical connection to the circuit 140. The circuit 140, in addition to the first and second conductive leads 142, 144, also has third and fourth conductive leads 210, 212 which can be connected to the power supply means 110. The third and fourth conductive leads 210, 212 can include serially connected fuses 214, 216 or other current limiting means. Terminals 222, 224 of the third and fourth conductive leads 210, 212 can be electrically connected to the third and fourth terminals 202, 204 of the power supply means 110. The other terminals of the third and fourth conductive elements 210, 212 are electrically connected to the terminals 158, 160 of the conductive leads 142, 144.

The third and fourth conductive leads 210, 212 can be used to sense the length or resistance of the circuit elements present between the terminals 146, 148 and the other terminals 158, 160 respectively. This allows the power supply means 110, when configured to include a voltage measurement device, to subtract the resistance of these circuit elements from the total resistance measured across terminals 146, 148 and to provide a more accurate measurement of the resistance of the squib resistance element 120.

Accordingly, an exemplary method for measuring the resistance of a resistance element can also include sensing the resistance of circuit elements in the circuit, and subtracting the circuit element resistance from a measured resistance of the circuit and the resistance element.

Figure 3A:
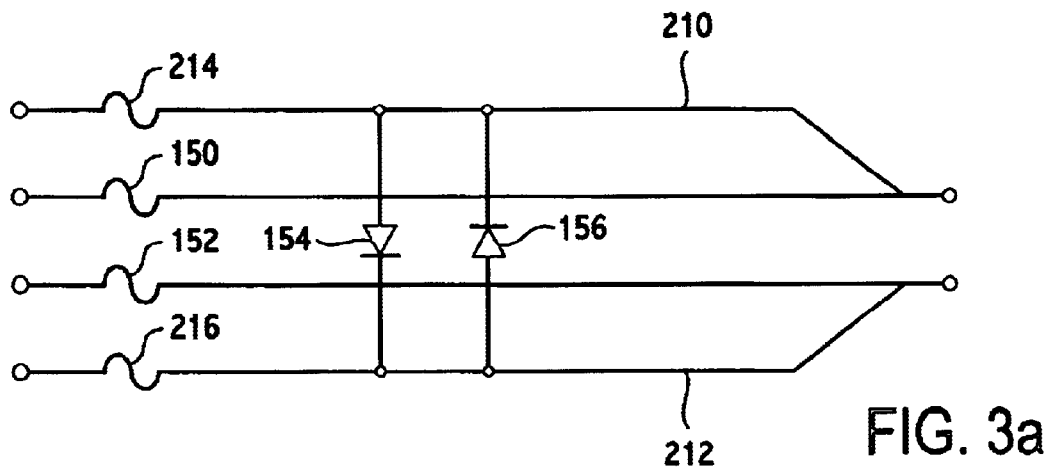
FIGS. 3a–3c illustrate circuits for measuring the resistance of a squib according to several exemplary embodiments of the invention.
Figure 3B:
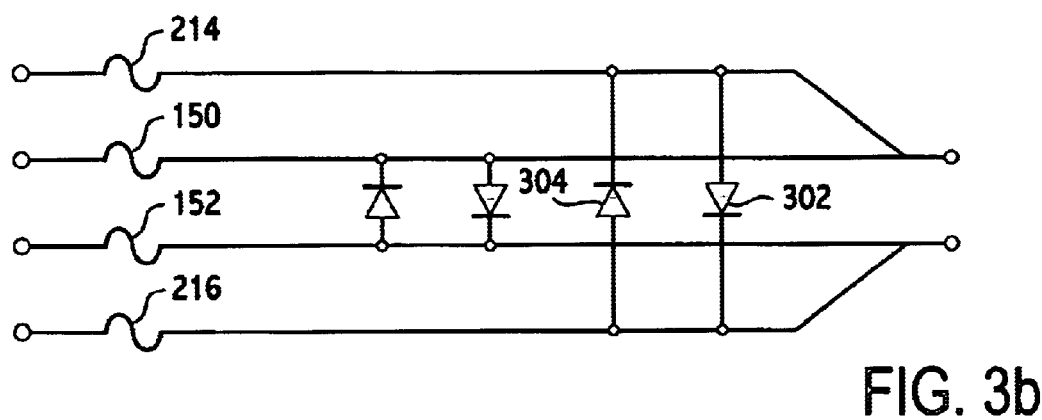
Figure 3C:
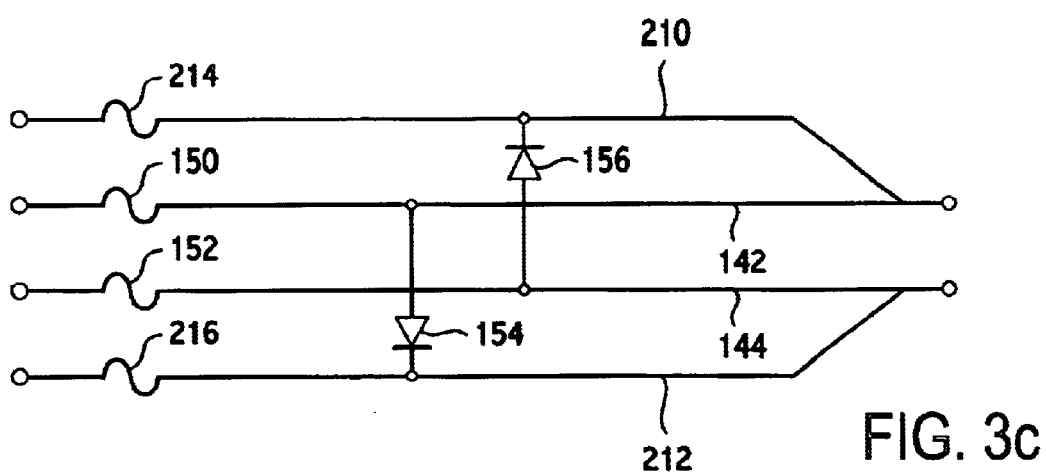

Other alternative circuits 140 can also be effectively used. FIGS. 3a, 3b, and 3c illustrate several embodiments of circuits 140 which include back-to-back diode pairs. In these embodiments, the diodes 154, 156 are arranged such that the cathode of each diode is electrically connected to a conductive lead 144 which has an in-line fuse. In FIG. 3b, back-to back diodes 302, 304 are connected to the second pair of conductive leads 210, 212, which have in-line fuses 214, 216.

Figure 4:
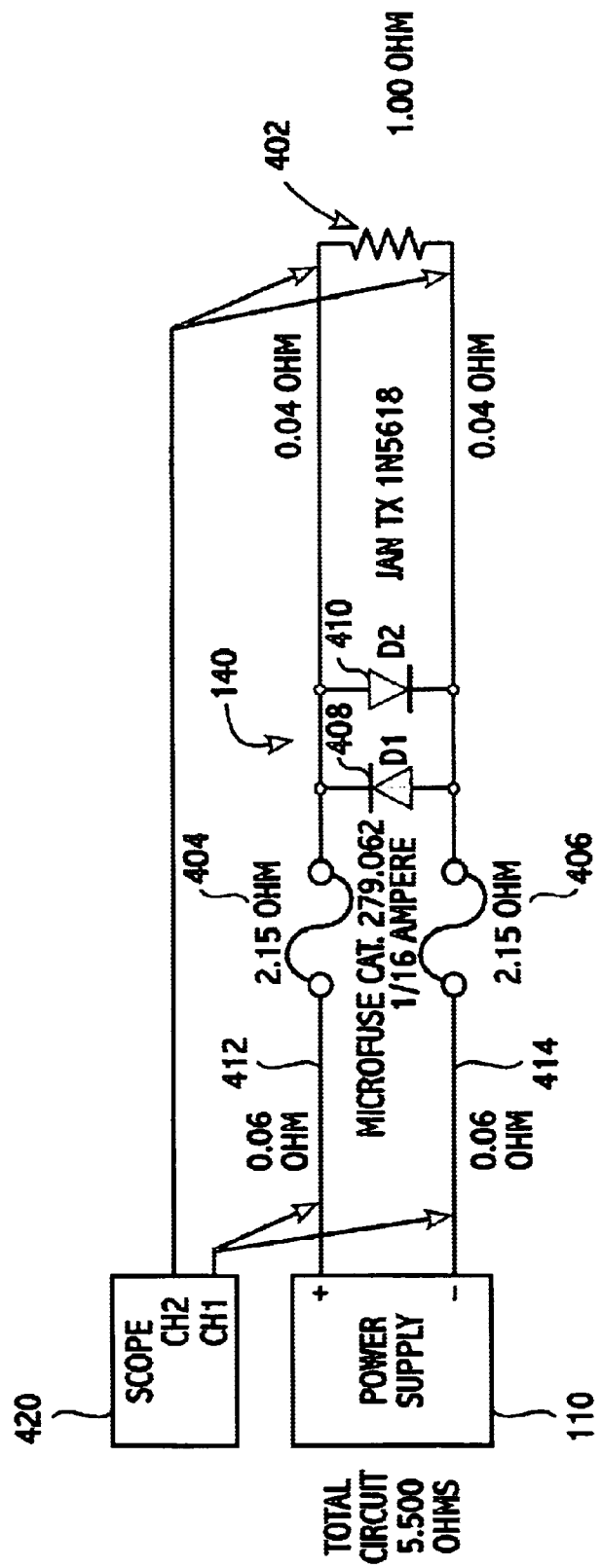
FIG. 4 illustrates an apparatus for measuring the resistance of a squib according to an exemplary embodiment configured to measure the resistance of a 1 Ohm squib simulator.

In one example, shown in FIG. 4, a circuit 140 shown in FIG. 1 was connected to a squib simulator 402 having a resistance of 1.0 Ohm. The fuses were 1/16th ampere fuses, available commercially from Littlefuse, Inc. under Microfuse catalog number 279.062. Each fuse 404, 406 has a resistance of 2.15 Ohms. The back-to-back diodes 408, 410 were JAN TX 1N5618. Each of the conductive leads 412, 414 had resistances of 0.1 Ohms, which included two sections having resistances of 0.06 and 0.04 Ohms. The resistance of the circuit 140 and the squib simulator 402 totaled 5.5 Ohms. An oscilloscope 420 was connected to the terminals of the conductive leads 412, 414.

As illustrated in the exemplary FIG. 5a plot of applied voltage (channel 1) and squib voltage (channel 2) versus time, when a voltage of 30 Volts DC at 5.45 Amperes was applied by the power supply means 110 across the terminals of the conductive leads 412, 414, the fast-switching diodes 408, 410 of the circuit limited the voltage applied to less than 2.43 volt (peak) in less than 5 microseconds 502. This 5 microsecond response time is approximately 6400 times smaller than the 32 millisecond time period required to activate the 1 Ohm squib. After the diode turn-on, the voltage across the squib was reduced to 1 Volt in less than 20 microseconds. The 20 microsecond response time was approximately 1600 times smaller than the 3.5 millisecond time period for activating the squib at 3.5 Amperes. The fuse opened in 28.7 microseconds 504, which is approximately 1116 times smaller than the 32 millisecond 3.5 Ampere activation time.

As illustrated in the FIG. 5b plot of applied voltage (channel 1) and squib voltage (channel 2) versus time, when a voltage of 10 Volts DC at 1.8 Amperes was applied to the same circuit, the fast-switching diodes of the circuit limited the voltage applied across the squib to less than 1.36 volt (peak) in less than 10 microseconds 506. The 10 microsecond response time is approximately 3200 times smaller than the 32 millisecond time period required to activate the 1 Ohm squib at 3.5 Amperes. After the diode turn-on, the voltage across the squib was reduced to 1 Volt in less than 10 microseconds. The 10 microsecond response time was approximately 3200 times smaller than the 3.5 millisecond time period for activating the squib at 3.5 Amperes. The fuse opened in 177.1 microseconds 508, which is approximately 180 times smaller than the 32 millisecond 3.5 Ampere activation time.

Figure 6:
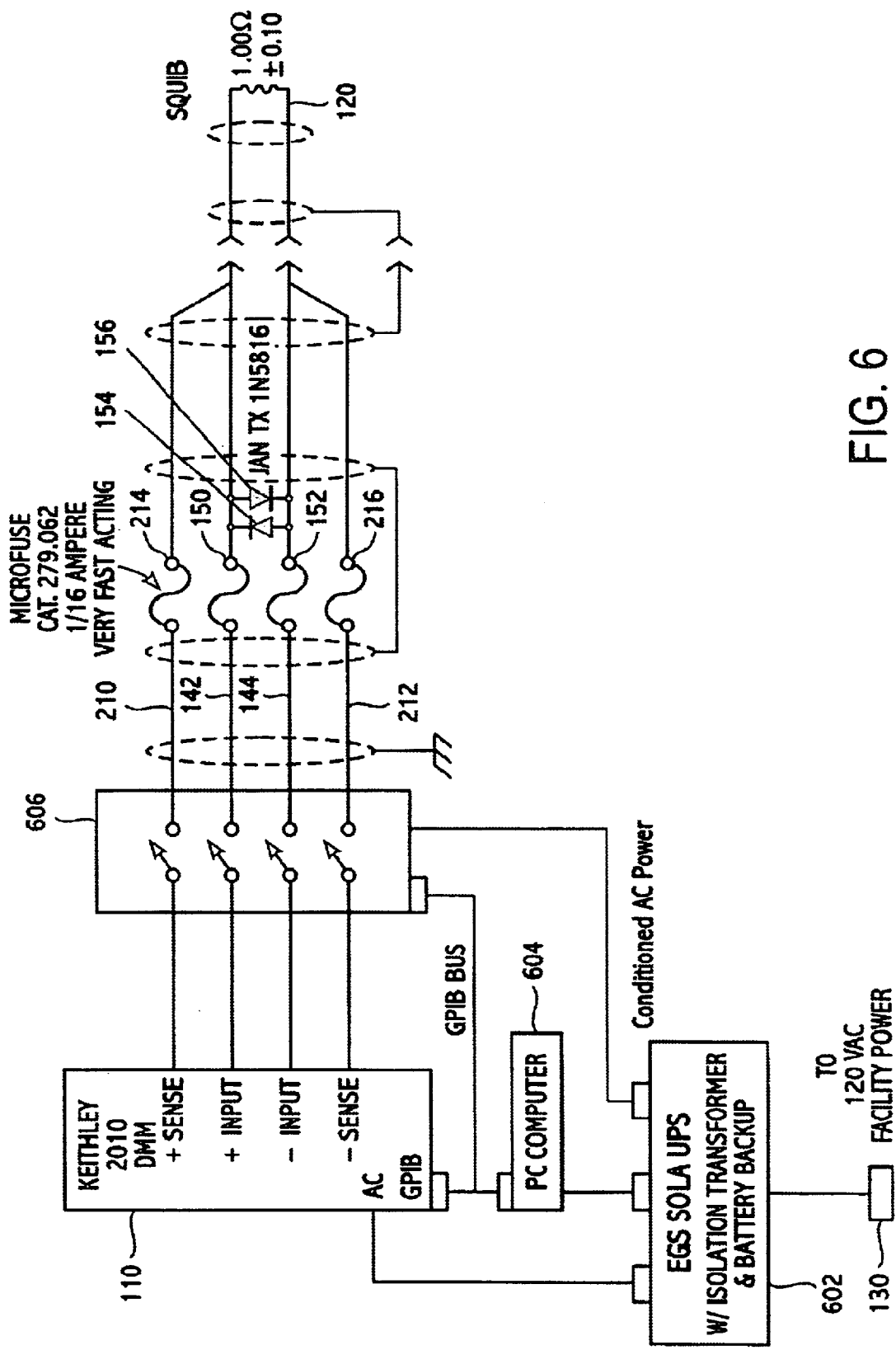
FIG. 6 illustrates an apparatus for measuring the resistance of a squib according to another exemplary embodiment.

FIG. 6 illustrates another embodiment of the apparatus 100, configured for automatic testing. The power supply means 110 is a Keithley 2010 digital multimeter with four terminals. The power supply means 110 receives 120 Volt AC facility power via a universal power source 602 with an isolation transformer and battery backup. A controller 604, here shown as a personal computer, is connected to the universal power source 604, the power supply means 110, and to the switching device 606. The switching unit 606 is used to automatically open and close the circuit upon a signal from the controller 604. The circuit 140, which includes the back-to-back diodes 154, 156, and fuses 154, 156, 214, 216, quickly interrupts the circuit if the current in the conductive leads 210, 212, 142, 144 or voltage across the conductive leads 210, 212, 142, 144 is too high. The diodes are JAN TX 1N5816, although other diodes can be used.

Figure 7:
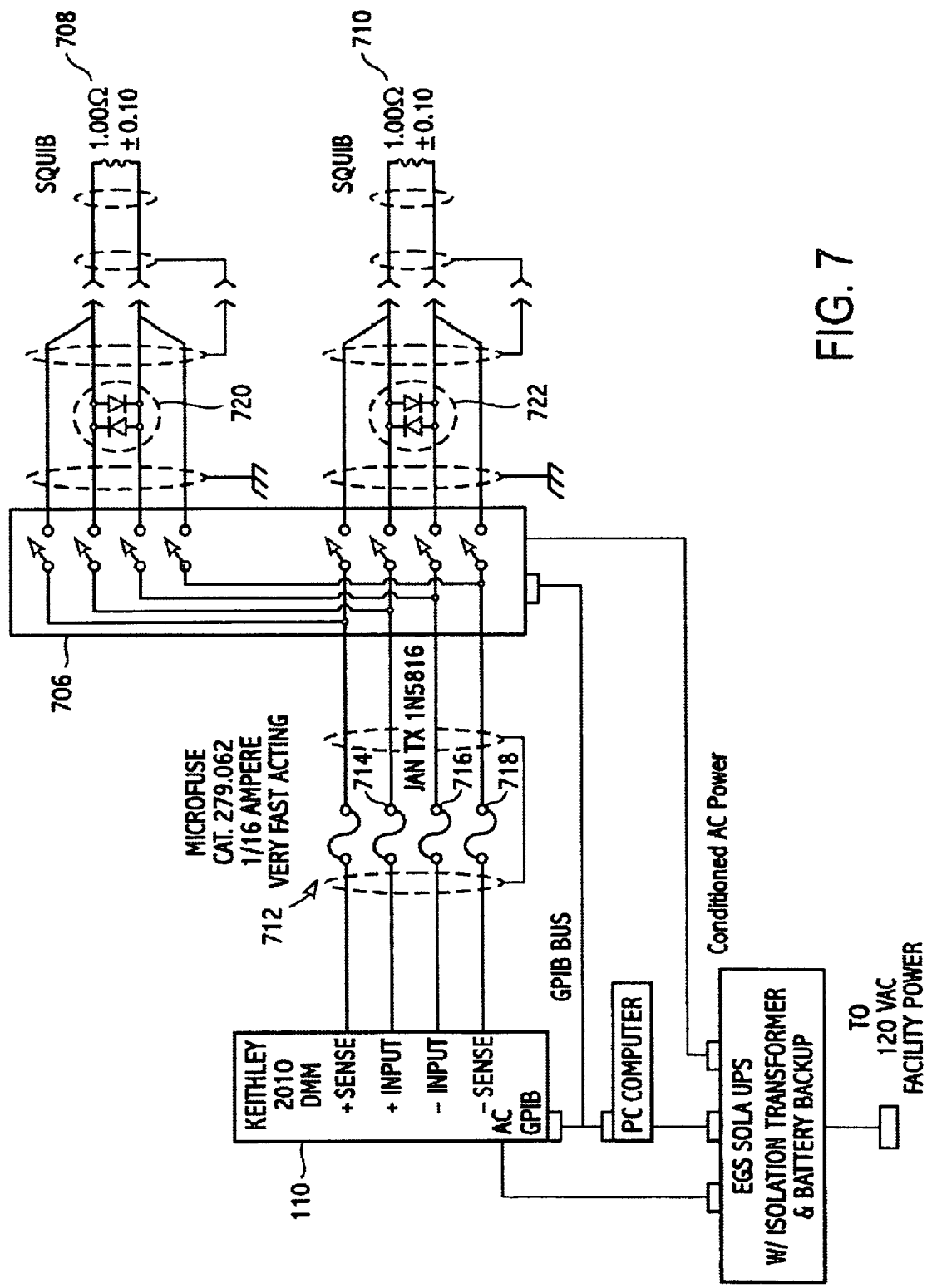
FIG. 7 illustrates an apparatus for measuring the resistance of more than one squib according to an exemplary embodiment of the invention.

FIG. 7 illustrates another embodiment of an apparatus 100 which can be used to test two squibs. The switching unit 706 switches the test current from one squib 708 to a second squib 710. Of course, the invention is not limited to testing two squibs, as a greater number of diode pairs and squibs may be controlled by the switching unit 706. If the switching unit 706 is located between the fuses 712, 714, 716, 718 and the squibs 708, 710, as shown in FIG. 7, only one group of fuses will be needed to test even a large number of squibs. The diode pairs 720, 722 may be located between the switching unit 706 and the squibs 708, 710, as shown in FIG. 7. Alternative configurations are also possible. For example, the diode pairs 720, 722 may be located adjacent to the fuses 712, 714, 716, 718, in a configuration similar to those shown in FIGS. 1, 2, and 6. If the diode pairs 720, 722 are located between the switching unit 706 and the squibs 708, 710, they will also protect the squibs from any overvoltage which may result from a fault in the switching unit 706 or its associated circuitry.

Prior to testing squibs, all test circuits can of course be tested to verify there is no voltage present before a squib is connected to the apparatus 110. To ensure both diodes are present and functional before connecting the squib, a resistance self test can be performed on the test circuit 140 prior to connection to the squib.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive, and the scope of the invention is to be determined by reference to the appended claims.

What is claimed is:

1. An apparatus for measuring the resistance of a squib, comprising:
   an input for receiving a power supply;
   a circuit electrically connected to the input for limiting the power supply, the circuit including:
      voltage limiting means for limiting a voltage output of the circuit to a level insufficient to ignite the squib, and
      current limiting means for limiting a current output of the circuit, the current limiting means being responsive to a current supplied upon activation of the voltage limiting means to limit the energy supplied by the circuit to a predetermined level following activation of the voltage limiting means.

2. The apparatus as in claim 1, the input comprising first and second conductive leads, and the voltage limiting means comprising a parallel arrangement of diodes between the first and second conductive leads.

3. The apparatus as in claim 2, wherein the current limiting means comprises:
   a first fuse electrically coupled to the first conductive lead;
   a second fuse electrically coupled to the second conductive lead,
   the first and second fuses being sized so that at least one of the first and second fuses opens when a current in a conductive lead reaches a preset value in a time period less than a time required to ignite the squib.

4. The apparatus as in claim 3, wherein the predetermined time period is less than the time required for a resistance element to heat sufficiently to ignite an adjacent explosive material.

5. An apparatus as in claim 3, wherein the first and second fuses are fast-acting fuses and rated to open upon application of a 1/16th ampere current.

6. An apparatus as in claim 3, wherein each of the first and second fuses open in less than ten milliseconds upon application of a 0.3 ampere current.

7. An apparatus as in claim 3, wherein the first and second diodes are switching diodes and open in less than 35 nanoseconds upon application of a 5 ampere current.

8. An apparatus as in claim 1, in combination with a power supply means for supplying a voltage and a current.

9. An apparatus as in claim 8, wherein the power supply means is a voltmeter.

10. An apparatus as in claim 8, wherein the power supply means has first and second electrical terminals for applying a current to the circuit, and third and fourth electrical terminals for receiving a voltage to be measured from the circuit.

11. The apparatus as in claim 8, wherein the power supply means has a maximum output voltage of 20 millivolts when applying a test current of 1 milliampere for measuring a resistance element having a resistance of about 1 ohm.

12. The apparatus as in claim 8, wherein the power supply means includes a universal power source with battery backup, the universal power source being connectable to alternating-current facility power.

13. The apparatus as in claim 8, wherein the power supply means includes a digital multimeter, the digital multimeter determining a resistance of the squib.

14. An apparatus as in claim 1, in combination with a squib having a resistance element.

15. An apparatus as in claim 14, comprising: an output for providing a voltage and a current to the squib, the output electrically coupled to the squib.

16. An apparatus as in claim 15, wherein the output comprises first and second conductive leads.

17. An apparatus as in claim 1, wherein the circuit comprises:

circuit sensing means for determining a resistance of circuit elements between a squib and a power supply means.

18. An apparatus as in claim 17, wherein the circuit sensing means includes third and fourth conductive leads each having a terminal for electrical connection to a resistance element and another terminal for electrical connection to a power supply means.

19. An apparatus as in claim 18, wherein the circuit comprises a fuse electrically coupled to the third conductive lead, and a fuse electrically coupled to the fourth conductive lead.

20. A method for measuring the resistance of a squib with a circuit having an input for receiving a power supply, voltage limiting means for limiting a voltage output of the circuit, and current limiting means for limiting a current output of the circuit, the method comprising:

applying a current and voltage to the squib by supplying power to the circuit;

limiting an energy supplied by the circuit to the squib to a predetermined level by activating the voltage limiting means if the voltage across conductive leads of the circuit is greater than a predetermined level and activating the current limiting means responsive to a current supplied on activation of the voltage limiting means; and measuring a resulting voltage.

21. A method according to claim 20, further comprising:

sensing the resistance of circuit elements in the circuit, and subtracting the circuit element resistance from a measured resistance of the circuit and the squib.

22. A method according to claim 20, wherein the voltage limiting means includes a parallel arrangement of diodes between a first and a second conductive leads of the circuit, and the current limiting means includes a first fuse electrically coupled to the first conductive lead and a second fuse electrically coupled to the second conductive lead, and wherein upon application of a voltage greater than a preset value, at least one of the diodes conducts current through at least one of the first and second conductive leads sufficient to activate at least one of the first and second fuses.

23. A safety circuit for enabling safe measurement of a resistance of a squib comprising:

an input that is connectable to a resistance measuring device, the resistance measuring device providing electrical energy to the input; and a limit circuit electrically coupled to the input for limiting electrical energy supplied to a squib from the resistance measuring device, the circuit including:

a voltage limiting circuit for limiting a voltage output from the limit circuit to a level insufficient to ignite the squib, and a current limiting circuit for limiting a current output from the limit circuit, the current limiting circuit being responsive to a current supplied upon activation of the voltage limiting circuit to limit electrical energy supplied by the limit circuit to a predetermined level following activation of the voltage limiting circuit.

24. The safety circuit as in claim 23, further comprising:

a resistance measuring device, the resistance measuring device being a digital multimeter and being connected to the input, the digital multimeter determining a resistance of the squib.

25. The safety circuit as in claim 24, further comprising:

a universal power source with battery backup coupled to the digital multimeter, the universal power source providing power to the digital multimeter, the universal power source being connectable to alternating-current facility power.

26. The safety circuit as in claim 23, wherein the current limiting circuit comprises first and second fuses coupled to the input and configured such that at least one of said fuses opens when a current passing therethrough reaches a preset value in a time period less than a time required to ignite the squib.

27. The safety circuit as in claim 23, wherein the input comprises first and second conductive leads, and the voltage limiting circuit comprises first and second diodes electrically connected in parallel between the first and second conductive leads such that a cathode of one diode is electrically coupled to an anode of the other diode.

* * * * *